(12) United States Patent
Auner et al.

(10) Patent No.: US 9,778,105 B2
(45) Date of Patent: Oct. 3, 2017

(54) STATIC INTERFEROMETER WITH STEP-STYLE REFLECTIVE ELEMENT

(71) Applicant: WAYNE STATE UNIVERSITY, Detroit, MI (US)

(72) Inventors: Gregory W. Auner, Livonia, MI (US); Changhe Huang, Novi, MI (US); Christopher M. Thrush, Shelby Township, MI (US); Michelle Brusatori, Sterling Heights, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 0 days.

(21) Appl. No.: 14/518,588

(22) Filed: Oct. 20, 2014

(65) Prior Publication Data

US 2015/0085284 A1    Mar. 26, 2015

Related U.S. Application Data

(63) Continuation of application No. PCT/US2013/037518, filed on Apr. 22, 2013.
(Continued)

(51) Int. Cl.
*G01J 3/28* (2006.01)
*G01J 3/02* (2006.01)
(Continued)

(52) U.S. Cl.
CPC ............... *G01J 3/021* (2013.01); *G01J 3/18* (2013.01); *G01J 3/44* (2013.01); *G01J 3/4412* (2013.01);
(Continued)

(58) Field of Classification Search
CPC ........ G01J 3/02; G01J 3/44; G01J 3/45; G01J 3/4412; G01J 3/021; G01J 3/4531;
(Continued)

(56) References Cited

U.S. PATENT DOCUMENTS

| | | | |
|---|---|---|---|
| 5,054,884 A | 10/1991 | Kubota | |
| 5,144,498 A * | 9/1992 | Vincent | G01J 3/12 250/226 |

(Continued)

FOREIGN PATENT DOCUMENTS

JP    2006-267388 A    10/2006

OTHER PUBLICATIONS

International Search Report and Written Opinion in related PCT application No. PCT/US2013/037518 Mailing Date Feb. 7, 2014.

*Primary Examiner* — Jamil Ahmed
(74) *Attorney, Agent, or Firm* — Brinks Gilson & Lione

(57) ABSTRACT

An apparatus for performing Raman spectral analysis of a sample is described, comprising a coherent light source, an first optical chain to direct the coherent light to impinge on the sample, a second optical chain to direct the scattered light onto a diffraction grating, and a third optical chain to direct the diffracted light onto detection array. The diffraction grating is a stairstep with a metalized surface, and a plurality of metalized stripes on a flat surface is disposed in a direction orthogonal to the long dimension of the stairsteps. The region between the flat surface and the stairstep is transparent. The zeroth-order fringe is selected by a slit and directed onto camera. The resultant interferogram is Fourier transformed to produce a representation of the Raman spectrum.

21 Claims, 7 Drawing Sheets

Related U.S. Application Data

(60) Provisional application No. 61/636,991, filed on Apr. 23, 2012.

(51) Int. Cl.
*G02B 5/18* (2006.01)
*G01J 3/18* (2006.01)
*G01J 3/44* (2006.01)
*G01J 3/453* (2006.01)
*G01J 3/45* (2006.01)

(52) U.S. Cl.
CPC ............... *G01J 3/45* (2013.01); *G01J 3/4531* (2013.01); *G01J 3/4532* (2013.01); *G02B 5/1861* (2013.01)

(58) Field of Classification Search
CPC   G01J 3/4532; G02B 5/18; G02B 5/20; G02B 5/1861; G01B 9/02; G01C 21/00
See application file for complete search history.

(56) References Cited

U.S. PATENT DOCUMENTS

| | | | |
|---|---|---|---|
| 5,949,578 A * | 9/1999 | Sermage | G02B 5/1847 356/305 |
| 6,118,518 A | 9/2000 | Hobbs | |
| 6,268,921 B1 | 7/2001 | Seitz et al. | |
| 7,050,171 B1 | 5/2006 | Banerjee et al. | |
| 7,330,266 B2 | 2/2008 | Guerineau et al. | |
| 7,359,058 B2 | 4/2008 | Kranz et al. | |
| 7,466,421 B2 * | 12/2008 | Weitzel | G01J 3/453 356/451 |
| 2007/0053576 A1 | 3/2007 | Neureuther et al. | |
| 2009/0254274 A1* | 10/2009 | Kulik | G01S 19/49 701/469 |

\* cited by examiner

STATIC INTERFEROMETER WITH STEP-STYLE REFLECTIVE ELEMENT

The present application is a continuation application of International Application PCT/US/2013/037518, filed on Apr. 22, 2013 which claims the benefit of priority to U.S. provisional application Ser. No. 61/636,991 filed on Apr. 23, 2012, each of which applications is incorporated by reference.

The research in this application was sponsored in part by the U.S. Government under DOD TARDEC contracts W56 HZV-06-C-0581 and W56 HZX-09-C-0231. The government has rights in this invention.

TECHNICAL FIELD

This application relates to an apparatus for measuring optical spectra.

BACKGROUND

Optical spectrometry may be performed by a variety of techniques, including multiplex filtering, interferometers and dispersive optical devices. Spectrometers may include, for example, grating-based spectrometers, scanning Fourier transform spectrometers, and dispersive Fourier spectrometers. Grating-based spectrometers typically combine a number of bulk optics components including mirrors, lenses, gratings, optical gratings, apertures, and beamsplitters. Fourier transform spectroscopic technologies are often implemented by using a variant on a Michelson interferometer, with one of the mirrors being scanned in distance along an optical path. The resultant interferogram at the detector is the Fourier transform of the optical spectrum, and the optical spectrum may be recovered by performing a Fourier transform of the received time series of optical intensity data.

Amongst the practical applications of these techniques is Raman spectroscopy. When light is scattered from a molecule or crystal most photons are elastically scattered, having the same energy (frequency) and therefore, the same wavelength, as the incident photons. However, a small component (approximately 1 in $10^7$ photons) is inelastically scattered, at wavelengths that are shifted from the incident radiation. The inelastically scattered photons provide chemical and structural information that is uniquely characteristic of the substance being irradiated. High-resolution detection of this Raman-scattered energy normally requires extensive laboratory facilities and large spectrometer systems, which act as either monochromators or interferometers. Such devices are generally not suitable for portable applications, being precision optical instruments and having moving or adjustable components.

Herein, the terms frequency and wavelength are used to describe the spectral characteristics of an energy spectrum, and a person of skill in the art will recognize that they are equivalent representations that are inversely proportional to each other, where the constant of proportionality is the speed of light. The terms will often be used somewhat interchangeably, so as to permit comparison with various conventional representations of bandwidth, resolution, and the like.

Raman spectra are typically expressed in wave numbers, which have units of inverse length. In order to convert between spectral wavelength and wave numbers of shift in the Raman spectrum, the following formula can be used:

$$\Delta w = \left( \frac{1}{\lambda_0} - \frac{1}{\lambda_1} \right),$$

where $\Delta w$ is the Raman shift expressed in wave number, $\lambda_0$ is the excitation wavelength, and $\lambda_1$ is the Raman spectrum wavelength. Most commonly, the units chosen for expressing wave number in Raman spectra is inverse centimeters ($cm^{-1}$). Since wavelength is often expressed in units of nanometers (nm), the formula above can scale for this units conversion explicitly, giving $$\Delta w (cm^{-1}) = \left( \frac{1}{\lambda_0 (nm)} - \frac{1}{\lambda_1 (nm)} \right) \times 10^7 \frac{(nm)}{(cm)}.$$

Typically, Raman spectroscopy is performed in the range 200-4000 $cm^{-1}$. A typical excitation wavelength may be 785 nm or 514 nm; however, the selection of wavelength may be governed by a number of considerations, including the avoidance of excitation of fluorescence in the sample.

Typical devices that produce interferograms are usually variants of the Michelson interferometer and generally have moving parts that allow small changes to be introduced in the optical path length between beams of light. An energy beam may be divided into two and beams which travel different optical paths which may be subsequently recombined in a common region where interference occurs. Since a single wavelength would result in a detected intensity that varies periodically with the optical path length, these variations are called fringes, A simplified example of a prior art Michelson interferometer is shown in FIG. 1.

An interferometer operates, typically, by splitting energy from a single source into two beams, and causing one of the beams to travel a different physical distance than the other. When the two beams are brought together again, the phase difference between the beams results in an interference pattern comprised of a series of alternating light and dark fringes, depending on the energy wavelength and the difference in path length, resulting in a variation of detected intensity which is also dependent on the overall spectral characteristics of the energy within the passband of the instrument.

In this example, a Michelson interferometer may comprise four "arms". The first arm is a source 15 of optical energy, the second arm contains a stationary reflector 20, the third arm contains a movable reflector 25, and the fourth arm leads to an optical power detector 30, such as a photodetector. At the intersection of the four arms an optical beamsplitter 35 is disposed so as to transmit half of the energy impinging thereon and to reflect the other half of the energy. As a result, the energy transmitted by the beamsplitter strikes the fixed reflector 20, and the light reflected by the beamsplitter strikes the movable reflector 25. After reflecting off their respective reflectors, the two energy beams recombine at the beamsplitter 35, and then exit along the fourth arm to an energy detector 30. In this configuration 50 percent of the light is lost prior to reaching the detector.

In a Michelson interferometer 10, a varying path difference between the two beams may be introduced by translating the movable reflector 25 towards and away from the beamsplitter 35. This path difference may be expressed as a phase difference, where the phase difference is proportional to the path difference and inversely proportional to the wavelength of the energy. When the beams that have reflected off the fixed 20 and movable 35 reflectors recombine at the beamsplitter 35 are in phase, an intense beam leaves the interferometer as a result of constructive interference. When the fixed and movable reflector beams are recombined at the beamsplitter 35 so that the beams are out of phase, little energy leaves the interferometer 10 as there is destructive interference. The measured beam intensity at the detector 30 represents the contribution of all the energy from all of the wavelengths that are present. When the reflector 25 is moved so as to change the difference in path lengths of the beam components, the variation of the beam intensity with path difference is termed an interferogram.

Considering the interferogram to be related to the time-domain behavior of the signal resulting from the path length change, the interferogram has been recognized as the Fourier-transform pair of the frequency spectrum of the energy producing the temporal pattern.

Modern digital signal processing technology enables rapid and precise determination of the corresponding frequency spectrum, including the amplitudes of the frequency components, from a time series. Such processing is generally performed by an algorithm known as a Fast Fourier Transform (FFT), although other spectral processing algorithms such as a DFT (discrete Fourier Transform) or Multiple Signal Classification may be used as well. The interferogram may be appodized (weighted) so as to minimize the effects of data truncation, as is known in the signal processing art.

The Michelson interferometer 10 uses a beamsplitter 35 and a moving reflector 25. Changes in the alignment of the beamsplitter 35, and non-uniformities in the movement of the reflector 25 contribute to errors in measurement and reduced repeatability.

SUMMARY

A spectrometer is described having a diffraction grating. The diffraction grating is a transparent structure having a triangular cross section and a metalized stairstep surface along the hypotenuse thereof. The top surface of the diffraction grating has a plurality of metalized stripes, spaced apart, and disposed such that the long dimension is orthogonal to the long dimension of the stairsteps. A collimator is disposed to direct an energy beam to the top surface of the diffraction grating at an off-normal angle to the top surface of thereof. The zeroth-order diffraction component may selected by a slit, and impinge on a plane where an interferogram is formed. A detector in the plane has a plurality of detection areas so as to measure the amplitude pattern of the interferogram.

The detection areas are photosensitive and may be arranged as a one- or two-dimensional planar array. The detected energy may be communicated to a processor where the information may be analyzed using Fourier transform or other spectral decomposition algorithms.

The spectrometer may be provided with a coherent optical source disposed so as to illuminate a sample and energy scattered from the sample may form the external beam to be analyzed. Other components may be used to guide the light from the source, to the sample, to the diffraction grating and to the detector elements, and may include an edge filter to reflect energy at a wavelength of the coherent optical source, and to pass energy at at least a wavelength hand having either a higher wavelength or a lower wavelength with respect to the coherent optical source.

In an aspect, the spectrometer device may have a housing within which the spectrometer is mounted, the housing having an aperture to pass the energy to be detected. The device may be combined with a local navigation system such that the direction of emission of the coherent beam, or the direction in which an aperture in the spectrometer device capable of accepting light energy is determined. The optical elements of the spectrometer device are fixedly disposed with respect to each other.

A camera operable in the visible light spectrum may be disposed to have a field of view that overlaps that of the spectrometer.

DESCRIPTION

Exemplary embodiments may be better understood with reference to the drawings, but these examples are not intended to be of a limiting nature. Like numbered elements in the same or different drawings perform equivalent functions. When a specific feature, structure, or characteristic is described in connection with an example, it will be understood that one skilled in the art may use such a feature, structure, or characteristic in connection with other examples, whether or not explicitly stated herein.

Embodiments may be implemented in hardware, firmware, software, or any combination thereof, and may include instructions stored on a machine-readable medium, which may be read and executed by one or more processors.

Figure 1:
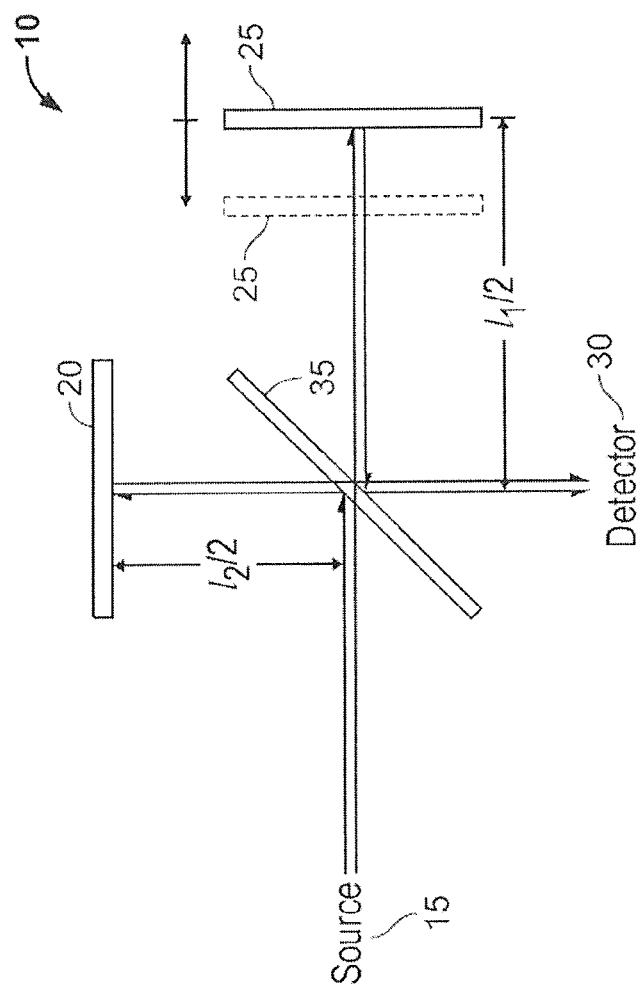
FIG. 1 is a plan view of a Michelson interferometer. (Prior art)
Figure 2:
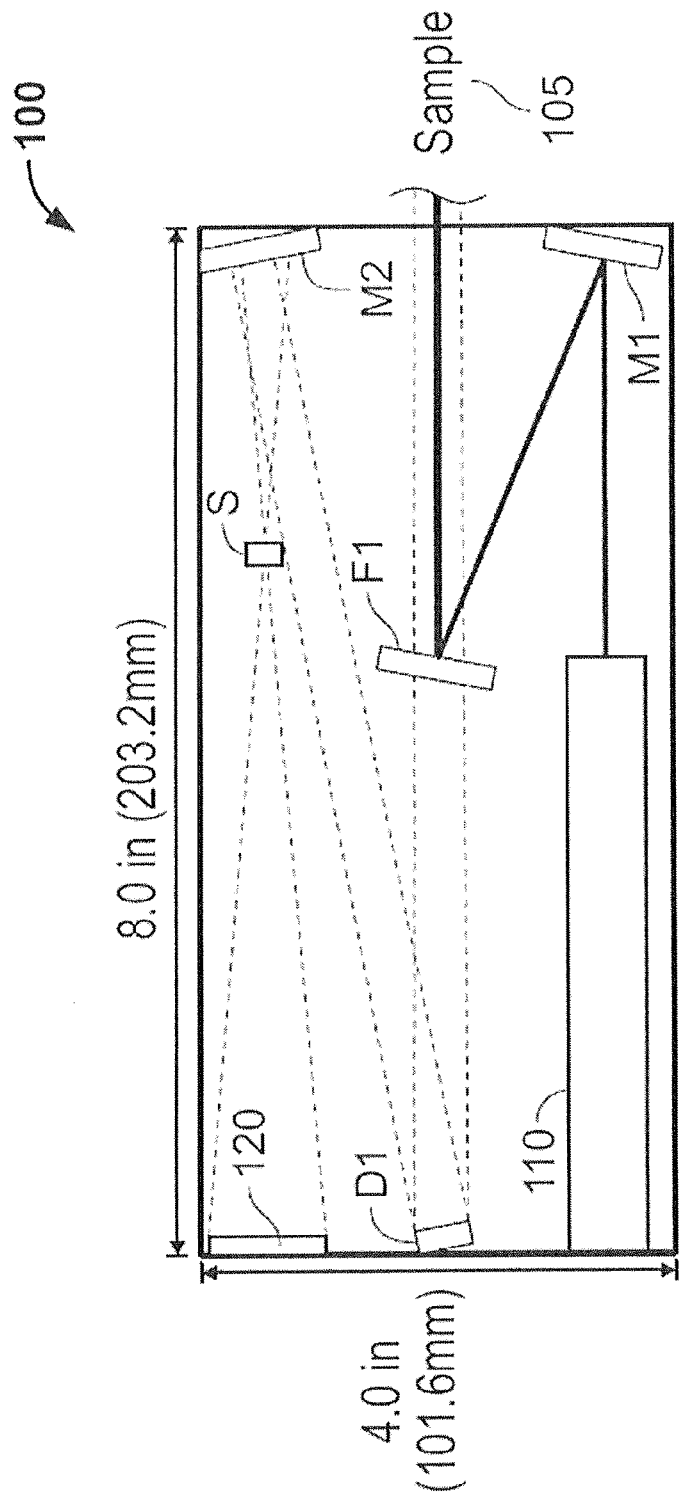
FIG. 2 is a plan view of a compact spectrometer incorporating a coherent energy source, a fixed interferometer grating and an energy detector.

FIG. 2 shows a conceptual design of a spectrometer 100 which may be used for Raman or other spectral measurements. Collimated light from a laser 110 (collimator not shown), which may be a laser diode or similar device, may be directed by a mirror M1 to be reflected by an edge filter F1 so as to exit the device and irradiate a specimen 105 or sample to be evaluated. A lens (not shown) may be disposed at the exit aperture of the spectrometer so as to collect the light energy scattered from the specimen 1055 and direct the light through the edge filter F1 so as to impinge on an interferometer element D1.

Apart from elastically scattered light energy, which is unchanged in frequency from the incident light, inelastic scattering results in wavelength-shifted (Raman) emissions that represent the Stokes and anti-Stokes response of a particular sample of material. These emissions are shifted in wavelength from the irradiating wavelength, and a portion of the emissions is directed back along the direction of the light emitted from the aperture of the spectrometer 1. The detailed spectral characteristics of the Raman-scattered light are of interest, as the spectral characteristics may be used to identify different material types, including composite material types.

The edge filter F1 may be an optical device having a passband and a stopband, wherein the transition between the passband and the stopband is relatively sharp. Light impinging on the edge filter F1 in the passband may pass through the filter with little attenuation, whereas light impinging on the edge filter in the stopband is essentially totally blocked. Here, the characteristics of the edge filter F1 may be chosen such that the excitation light wavelength is in the stopband and the filter reflects the light from the edge filter F1, and directed towards the specimen 105. Light returning from the specimen 105 is comprised of the unshifted (elastically scattered) laser light and the Raman emissions (inelastically scattered light) that are shifted in wavelength from the laser light. The unshifted laser light returning from the specimen 105 is again reflected from the filter F1, and may be directed towards an absorbing region (not shown) within the spectrometer 100 so as to be substantially attenuated. One of the group of Stokes lines or anti-Stokes lines of the Raman spectrum may be transmitted through the filter F1, depending on whether the filter F1 is of the long-wave-pass or the short-wave-pass design, so as to impinge on a reflective element D1.

The Raman scattered light may then be reflected off of the reflective element D1 which separates the light into different spectral components as will be further described. The dispersed light is then reflected off of a mirror M2, which may be a focusing mirror, through an aperture S and is then be detected by, for example, an imaging device 120 or digital camera, which may be a charge coupled device (CCD). Other components such as focusing lenses or mirror may be used, but are not shown for simplicity.

In an example, the CCD may be a one or two dimensional array of light sensitive elements that are used to record the one or two dimensional spatial distribution of the light impinging thereon.

Figure 5:
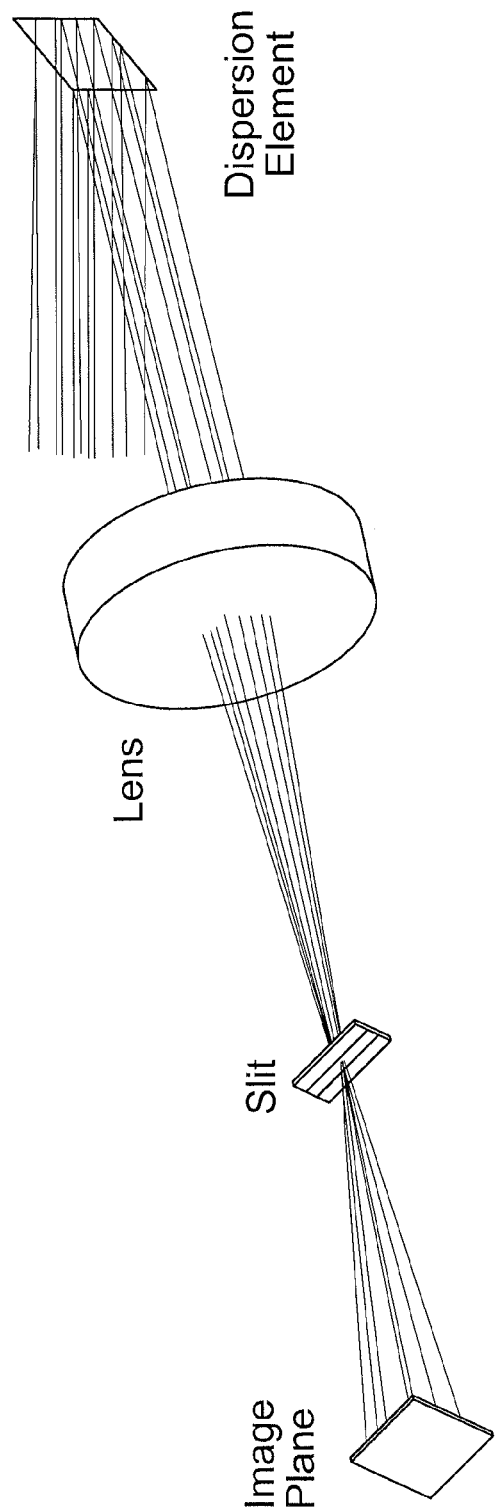
FIG. 5 illustrates the path of the dispersed energy from the grating being directed through a lens and selected by a slit before being detected at the image plane.

The elements of the interferometer are shown as being disposed within an enclosure of relatively small size (about 203 mm by 101 mm, and sufficiently thick to contain the components). This is an example where the light path is folded so as to reduce the overall size of the apparatus so that a portable version may be constructed. Other arrangements of the components where the light path is, for example, focused by passing through a lens (such as shown in FIG. 5) are also possible, depending on the specific design criteria.

Figure 3:
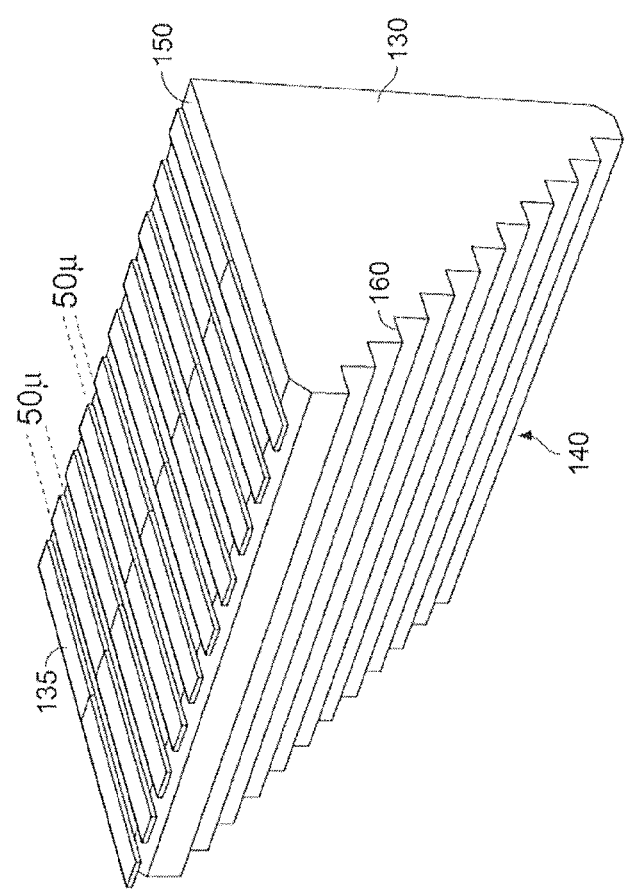
FIG. 3 illustrates a section of a dispersion element D1 having stairstep reflective elements; the section shown is about 50 microns high and the strips on the top surface are about 50 microns wide and may be separated by about 50 microns; the stairs may have a step height of about 5 microns.

FIG. 2 shows the Raman-scattered light incident on a diffraction element D1 which may be a reflecting staircase structure a portion of which is such as shown in FIG. 3. In this example, the plane of the top surface 150 of the diffraction element D1 is oriented at an angle of about 10° to the incoming light so as to direct the light onto the mirror M2 and to avoid the edge filter F1 or other internal components of the device. The individual steps of the staircase element and the spaced reflecting strips on the top surface create a multitude of reflected beams having different optical path lengths when beams have propagated so as to be reflected from the focusing mirror M2 to converge at the aperture S. Each individual beam is a wave-front and the individual wave-fronts overlap on the focal plane where the CCD is located. As is typical of grating-type reflective elements, various orders of dispersed energy result. In this instance the aperture S is used to select zeroth-order rays, while blocking the higher order dispersion products.

Figure 4:
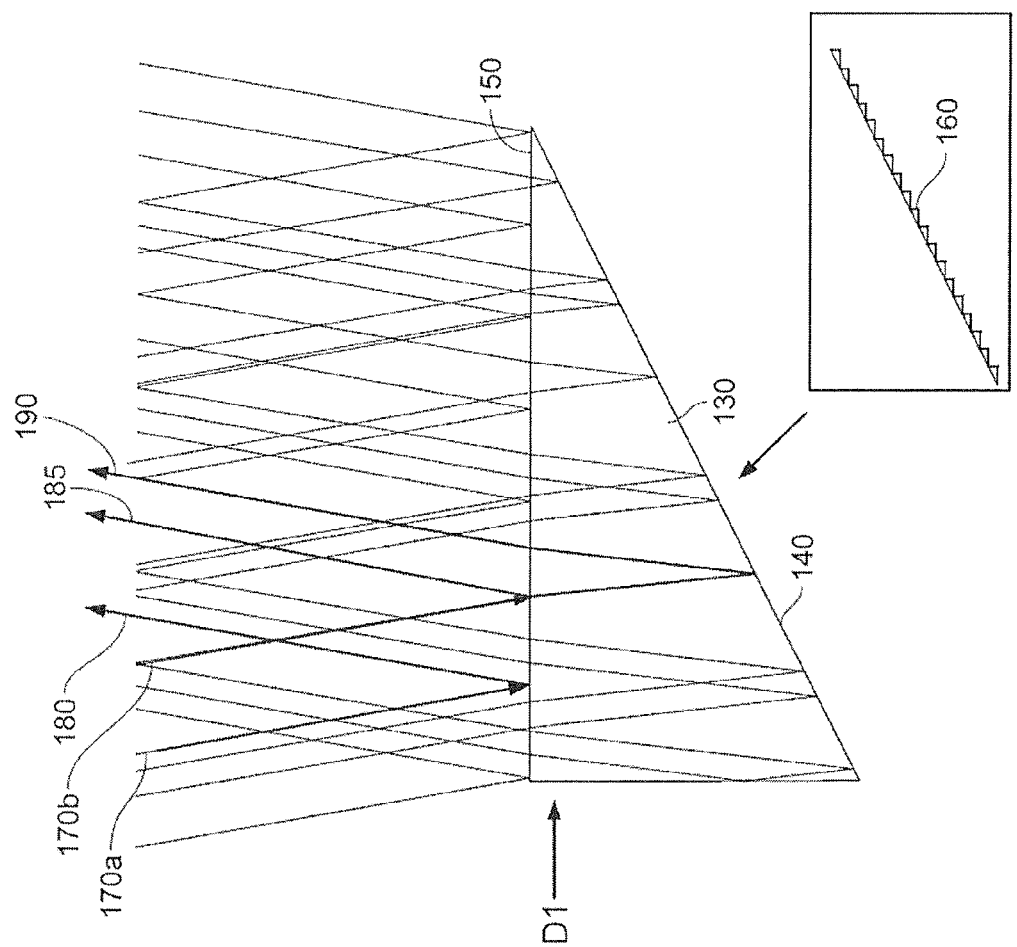
FIG. 4 shows light incident on the top surface of the transparent structure shown in FIG. 3.

In an example, shown in FIGS. 3 and 4, the reflective strips on top of the dispersion element D1 are about 50 microns wide with about a 50 micron spacing therebetween and extend along the top surface 150. The staircase portion 140 of the device D1, along the hypotenuse of the structure, may comprise, for example, 2000 steps 160 (of which 12 are shown in FIG. 3), with each step having a height (rise) and length (run) of 5 microns and a long dimension that may be equal to the long dimension of the step. With a step height of 5 microns and 2000 steps, the depth of the structure would be about 10 mm, and the width and length of D1 may have corresponding dimensions.

FIG. 4 illustrates a plurality of light rays, where some of the light rays are incident on the reflective stripes 135 on the top surface 150 of the dispersion structure D1 and be reflected therefrom; other rays pass through the top surface 150 of the structure so as to be reflected by the reflective surfaces 160 of the steps that are disposed along the hypotenuse 140. The top surface 150 of the structure D1 is inclined at a small angle (for example, about 10°) to the incident light, as shown in FIG. 2. The incident light beam makes a near-normal angle to the top surface 150 of the grating structure. The portion of the incident beam that is not reflected from the reflective stripes on the top surface of the structure is reflected from the metalized stairsteps, which change in distance from the top surface along the hypotenuse of the grating structure so as to create a multitude of reflected beams having differing optical path lengths. The reflected beams are directed on to mirror M2 and a spherical lens so that the reflected light interferes at the focal plane, where the zeroth-order fringe is selected using a slit. The lens and mirror may be combined if the mirror is non-planar.

In this example, where the light paths are shown in FIG. 4, which represents the outline of element D1; the actual reflecting strips are not shown either on the surface 150 on the hypotenuse 140 as they are substantially smaller in scale. A ray of light 170a incident on the top surface 150 that is reflected by a reflecting strip 135 is shown as 180. Another ray 170b that is incident on the top surface 150 and reflected is shown as 185, and a nearby ray that passes through an adjacent portion of the top surface 150 not having a reflective stripe 135 and which is reflected from the stairstep is shown as 190. With this as a guide, other rays are shown having various ray paths depending on where the energy is reflected in the diffraction element D1 are also shown. Rays that are subject to multiple reflections are not shown.

Placing a narrow slit S at the focal plane of the dispersed light, allows the interference pattern to be generated on an image plane and the resultant interferogram is detected by a CCD array 120 positioned at the image plane and sent to a computer for data processing. Analysis of the interferogram is performed, for example, by applying a 2-D Fast Fourier Transform (FFT) to the interference pattern.

The dispersive element arrangement is similar to a lamellar grating, where the optical path between a sloped element and a reflection from the base length would vary continuously along the length of the reflecting surface. The specular reflection angle of a conventional lamellar grating is small, perhaps 5 degrees. However, the reflection of energy from the base and from the sloped surface would be at different angles for the specular (zeroth-order) case. As such, there is a practical limit on the tilt angle of the sloped element of a conventional lamellar grating. This places a corresponding limit on the maximum total path length difference which can be created by the lamellar grating. Since the resolution of a spectrometer device of this type depends on the inverse of the maximum path length difference between the interfering energy beams, the resolution of a conventional lamellar grating is poor. In the present example of FIG. 4, the slope of the grating in D1 is 45°.

The steps in the staircase of FIG. 4 are disposed parallel to the top surface of the dispersion structure D1, and when the top surface 150 is oriented at an angle to the incoming beam as shown in FIG. 3, substantially all of the specularly reflected energy is directed at a same reflection angle. In this instance, where the angle of incidence of the optical energy is 10° with respect to orthogonal incidence, the specularly-reflected components (zeroth-order dispersion) from each of the adjacent stairstep elements is −10°, even though the overall slope of the stairstep is 45° with respect to the top surface. As such, the maximum path length difference that may be achieved is substantially greater than for a conventional lamellar grating, and the resolution is correspondingly better.

For the zeroth-order rays, wavelength-related dispersion does not occur. Rather, all of the wavelengths are reflected at the same angle, as is typical of specular reflection. The specular reflection angle is determined by the overall orientation of the structure with respect to the incoming optical beam. But, the stairstep reflector arrangement causes the light reflected from closely-spaced portions of the stairstep structure to have differing physical optical path lengths at the detector, the phase difference between components of the light depends on the wavelength of the light.

In another example, shown in FIG. 5, an aperture or slit S is disposed at the focal plane of the zeroth-order component so that the higher-order dispersion products are blocked. The light rays resulting from specular reflection of the incoming light from the stairstep reflective element, that has been selected by the aperture S, impinge on the detector array 120. A lens L1 rather than a concave mirror M2 may be used to focus the light received from dispersion element D1. The choice between a mirror and a lens may be dependent on the geometrical arrangement of the components, and whether the chromatic dispersion introduced by the lens may be acceptable.

An energy detector or camera, which may be an energy detector array such as a charge coupled device (CCD), may be disposed at a suitable distance from the slit so that the selected zeroth-order dispersion (reflection) products fall thereon, and the spatial properties of the interferogram are determined.

When the light energy impinges on an individual detector element P, the differing optical wavelengths and path lengths associated with the stairstep properties of the reflector result in an interference pattern. Where the detector is a plurality of detector elements P, such as may be found in a charge coupled device (CCD), or other detector array, an interference pattern is created by the action of detecting the energy as a function of position along the CCD x-y plane. This two-dimensional interference pattern is an interferogram which is characteristic of the wavelengths and amplitudes of the components of the light present. Such a pattern is an autocorrelation function and has a well-known Fourier-transform-pair relationship with the frequency spectrum of the light causing the interference pattern. The optical resolution depends on the total optical path length difference which is about twice the total step height (the reflective device height).

In this example, the energy in the image plane is spread in two dimensions, so that the interferogram is a two-dimensional pattern and is processed by a two-dimensional Fourier transform. Alternatively, a cylindrical lens (not shown) may be disposed between the slit S and detector array 120 at the image plane, as so as to focus the energy into a linear pattern so that a one-dimensional Fourier transform may be used. This is a design choice which may be made depending on the specific performance attributes desired.

To evaluate an example of a reflective element D1, ZEMAX simulation software (Radiant ZEMAX LLC, Bellevue, Wash. 98004) was used for a 10 mm×10 mm×10 mm element. The reflective strips on top of the device were 50 microns wide with 50 micron spacing. The staircase portion of the device, along the hypotenuse of the structure, comprised 2000 steps, with each step having a height (rise) and length (run) of 5 microns and width of 50 microns. With an incident angle of 10 degrees to the normal of the dispersion element surface, a resolution greater than 0.025 nm at incident wavelengths of about 500 nm was obtained in the simulation.

The dispersion element described herein results in a higher signal strength at the detector when compared with conventional designs, as the structure eliminates the need for a beamsplitter in the interferometer. When the angle of incidence with respect to the top surface is 10 degrees and the step height is equal to the step length, about 92% of the incoming light is directed to the detector as compared with the use of a beam splitter which allows about 25-50% of the light to reach the detector. This estimate includes surface reflection for the light both entering and exiting the dispersion element body.

The configuration of the dispersion element D1, described above, permits a spectral resolution comparable to that of a bench-top laboratory system. For example, the resolution of a ½ meter Czerny-Turner monochromator utilizing a 2400 l/min grating with a central wavelength of 500 nm and a slit width of 50 microns is 0.06 nm, with a bandpass of 0.037 nm. This comparison device is a scanning-type interferometer and essentially one-wavelength-resolution-element-at-a-time is measured, and the values of the interferogram spectral elements are obtained sequentially. Mechanical movement of the grating is required to cover an adequate spectral range, whereas no mechanical movement is required for the configuration in FIG. 2. In another aspect, the excitation light energy may be delivered to the sample by a separate path from that on which the scattered light may be received by the spectrometer. The light may be delivered by free-space optics, fiber optics, or a combination of the techniques. Further, a plurality of energy sources may be used. The scattered light may be returned to the spectrometer by a light pipe, an imaging lens or the like, such that mirror M1 may be eliminated, and the filter F1 used as a bandstop filter to suppress the excitation light that is elastically scattered back to the spectrometer.

Other spectrometer uses may not involve the illumination of a specimen by an optical energy source associated with the spectrometer. An emission spectrum or scattering spectrum of an object may be measured by collecting light radiated or reradiated from the object and, using the reflective element D1, the slit S and the detector P so as to produce an interferogram of the collected light.

The type of spectrometer described herein does not have any moving parts associated with the optical paths, and the orientation of the elements of the optical chain is fixed at the time of manufacture and may not require any further calibration or adjustment. This approach results in a device having lower sensitivity to environmental effects, including shock and thermal effects, a high efficiency in collecting and detecting the energy to be analyzed, and the ability to process all of the spectral bandwidth simultaneously using a Fourier transform processing technique. By collecting all of the of the interferogram pattern simultaneously, the temporal response time of the measurement is substantially improved. Many of the signal processing techniques that have been developed for spectral-domain and time-domain processing of electrical signals and images may be used analogously here so as to improve signal-to-noise ratio, correct aberrations in the optical device and other such features, as are known in the art.

The selection of the wavelength of the exciting energy depends on the specific substances to be investigated and may range, for example, over the entire visible and near visible spectrum, compatible with the selection of the optical components of the spectrometer. Solid state lasers operating at 408 nm and solid state lasers at about 514, 785 and 1060 nm, for example, would also be useful. The particular dimensions of the grating may be influenced also by the choice of fabrication method. However, nothing herein should be interpreted to require that the grating be fabricated by a particular technical approach.

Figure 6:
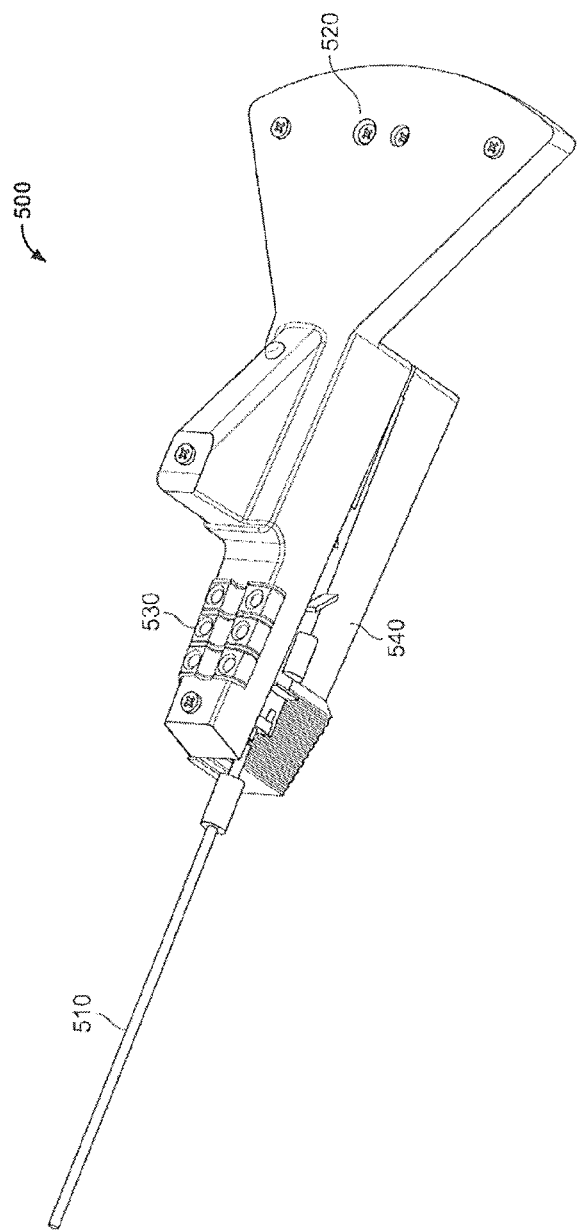
FIG. 6 is a perspective view of an example of the use of a stepped grating interferometer in a hand held device having local navigation capability; and, FIG. 7 is a cutaway view of FIG. 6 showing a conceptual location of the spectrometer components.
Figure 7:
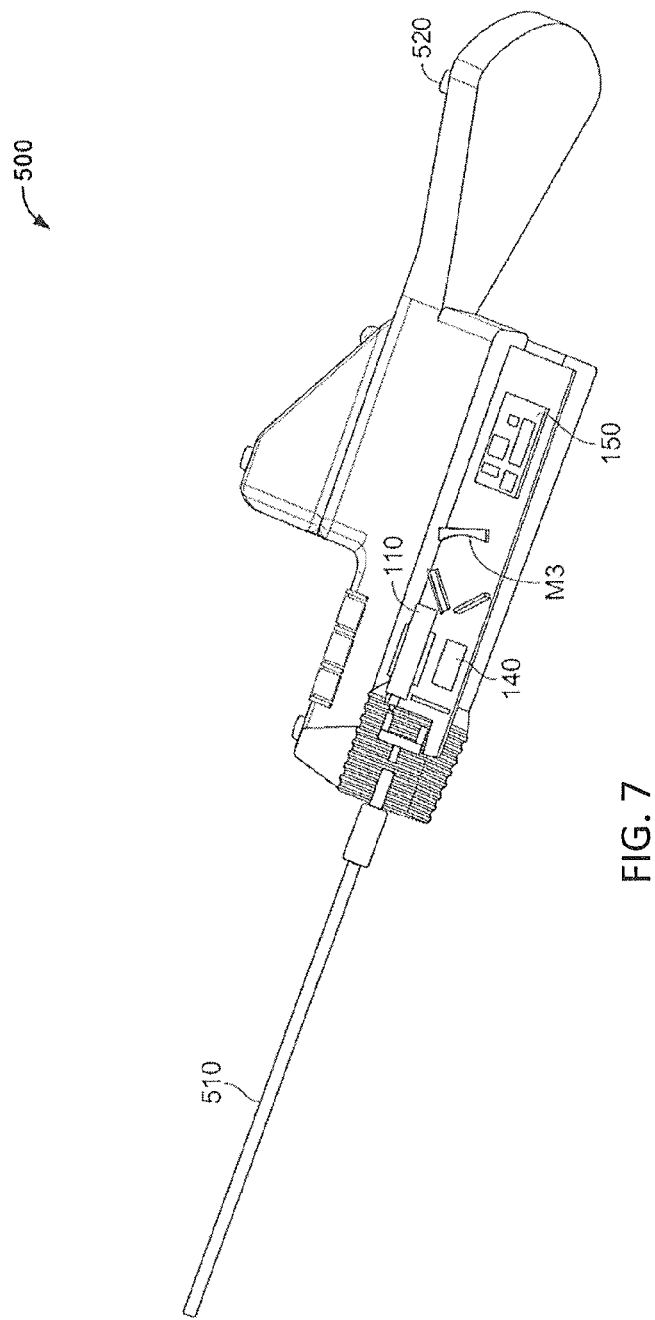

A small, rugged spectrometer may have a variety of applications, in Raman spectrometry and in other spectrometric applications. For example, a Raman spectrometer, such as shown in FIG. 2 may be packaged in a small hand held device, such as is shown in FIGS. 6 and 7. This is an example of a housing of a Stryker ENT camera system having a navigation capability. The system uses photodiodes to track the location and orientation of the device, and the field of view in real time for surgical applications. It is known that normal and abnormal tissues of the same type exhibit different Raman spectra. Intra-operatively imaging an in-vivo tissue may assist the surgeon in more precisely delimiting the area to be excised during the procedure. Such a tool may permit the surgeon to more definitively ascertain whether the entire affected area has been removed. In any event, a preliminary diagnosis may be made without waiting for laboratory results. A conventional CCD camera apparatus, as is ordinarily used by the current commercial product may be supplemented by the Raman spectrometer described herein, or a separate Raman spectrometer having the same or similar navigation capabilities may be used. The Raman spectrometer may be configured to have a smaller field of view than that of the visible camera, and the spectrometer probe manually or automatically scanned over the area to be investigated. The resultant visible and spectrometer results may be combined for visualization by known image processing techniques. When the Raman spectrometer results indicated abnormal tissue, by a specific characteristic Raman spectrum, the region may be indicated on the visible camera image by false color imaging.

Other device navigation systems which may use, optical, magnetic, acoustic or radio frequency positioning technology may be used. Alternatively, a configuration where the same device has both a camera and the Raman spectrometer may display a visual image, and the portion of the visual image being illuminated for the Raman spectrum may be indicated thereon. The result of the spectrum measurement may be displayed as a graph, or the spectrum may be compared with a library of spectra in the processor and the substances (s) which match the library spectrum may be indicated by a text or color. Since the entire spectrum is obtained simultaneously, the movement of the probe so as to manually or automatically scan an object may permit localization of a particular substance in a heterogeneous object or mixture.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A spectrometer, comprising:
   a diffraction grating comprising a transparent structure having a metalized stairstep surface, disposed to have a slope with respect to a top surface of the diffraction grating and faces of the stairstep surface are disposed parallel to the top surface,
   a collimator disposed in an externally incident energy beam configured to direct a collimated beam to the top surface of the diffraction grating at an off normal angle to the top surface of thereof; and
   a detector having a plurality of detection areas, the detector disposed to intercept energy reflected by the diffraction grating,
   wherein the top surface has a portion with a metalized reflective surface, disposed so that a portion of light incident at the off normal angle to the top surface is reflected from the top surface and another portion of the light is reflected from faces of the stairstep surface.

2. The spectrometer of claim 1, wherein a slit is disposed between the diffraction grating and the detector.

3. The spectrometer of claim 2, wherein a reflector is disposed between the diffraction grating and the slit.

4. The spectrometer of claim 1, wherein a detection area is a photosensitive circuit and the detection areas are arranged as a linear array.

5. The spectrometer of claim 4, wherein energy detected by the detector is communicated to a processor configured to perform a one dimensional Fourier transform.

6. The spectrometer of claim 1, wherein a detection area is a photosensitive circuit and the detection areas are arranged as a two dimensional array.

7. The spectrometer of claim 6, wherein energy detected by the detector is communicated to a processor configured to perform a two dimensional Fourier transform.

8. The spectrometer of claim 1, further comprising:
   a coherent optical source disposed so as to illuminate a sample to form the externally incident energy beam.

9. The spectrometer of claim 8, further comprising:
   an edge filter,
   wherein the edge filter is selected to reflect energy at a wavelength of the coherent optical source, and to pass energy at at least a wavelength band having either a higher wavelength or a lower wavelength with respect to the coherent optical source.

10. The spectrometer of claim 9, further comprising a housing within which the spectrometer is mounted, the housing having an aperture to pass the energy to be detected.

11. The spectrometer of claim 10, wherein an orientation and location of the housing is determined by a navigation system.

12. The spectrometer of claim 3, wherein the reflector is planar.

13. The spectrometer of claim 3, wherein the reflector has an axially symmetric surface.

14. The spectrometer of claim 3, wherein the reflector has a cylindrical surface.

15. The spectrometer of claim 1, wherein the diffraction grating, a lens and the detector are fixedly mounted with respect to each other.

16. The spectrometer of claim 1, further comprising:
a housing accepting the spectrometer; and
a local navigation system referenced to the housing and locating the direction in which energy from a coherent optical source exits the housing.

17. The spectrometer of claim 16, further comprising a digital camera having a field of view referenced to the housing.

18. The spectrometer of claim 17, wherein the field of view of the spectrometer and the field of view of the digital camera overlap.

19. The spectrometer of claim 1, wherein the portion of the top surface with the metalized reflective surface alternates with a portion of the top surface that does not have a metalized reflective surface.

20. The spectrometer of claim 1, wherein the portion of the top surface with the metalized reflective surface comprises a strip of metal having a long dimension oriented in a first direction and a length of the faces of the stairstep surface is oriented in a second direction.

21. The spectrometer of claim 20 wherein a plane passing through the first direction and a plane passing through the second direction are orthogonal to each other.

* * * * *

UNITED STATES PATENT AND TRADEMARK OFFICE
CERTIFICATE OF CORRECTION

PATENT NO. : 9,778,105 B2
APPLICATION NO. : 14/518588
DATED : October 3, 2017
INVENTOR(S) : Gregory W. Auner et al.

Page 1 of 1

It is certified that error appears in the above-identified patent and that said Letters Patent is hereby corrected as shown below:

In the Claims

In Column 10, Claim 1, Line 18, after "the top surface" replace "of thereof;" with --thereof;--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*